(12) United States Patent
Han

(10) Patent No.: US 6,973,062 B1
(45) Date of Patent: Dec. 6, 2005

(54) METHOD FOR CONTROLLING CALL ACCESS OF TERMINAL IN MOBILE COMMUNICATION SYSTEM

(75) Inventor: Jong Sun Han, Seoul (KR)

(73) Assignee: LG Information & Communications, Ltd., Seoul (KR)

( * ) Notice: Subject to any disclaimer, the term of this patent is extended or adjusted under 35 U.S.C. 154(b) by 0 days.

(21) Appl. No.: 09/303,554

(22) Filed: May 3, 1999

(30) Foreign Application Priority Data

May 4, 1998 (KR) .............................. 1998/16025

(51) Int. Cl.$^7$ .......................... H04B 7/216; H04J 11/00; H04H 1/00
(52) U.S. Cl. ..................... 370/335; 370/209; 370/342; 370/441; 370/312
(58) Field of Search .............................. 370/335, 209, 370/341–342, 312, 432, 441

(56) References Cited

U.S. PATENT DOCUMENTS

| | | | | |
|---|---|---|---|---|
| 5,621,723 A | * | 4/1997 | Walton, Jr. et al. | 370/335 |
| 5,678,181 A | * | 10/1997 | Kamachi | 455/33.1 |
| 5,946,356 A | * | 8/1999 | Felix et al. | 375/295 |
| 6,084,884 A | * | 7/2000 | Adachi | 370/441 |
| 6,097,707 A | * | 8/2000 | Hodzic et al. | 370/321 |
| 6,185,246 B1 | * | 2/2001 | Gilhousen | 375/200 |
| 6,208,871 B1 | * | 3/2001 | Hall et al. | 455/517 |
| 6,292,471 B1 | * | 9/2001 | Cao et al. | 370/252 |
| 6,356,595 B1 | * | 3/2002 | Czaja et al. | 375/262 |
| 6,377,809 B1 | * | 4/2002 | Rezaiifar et al. | 455/455 |
| 6,728,233 B1 | * | 4/2004 | Park et al. | 370/342 |

* cited by examiner

Primary Examiner—Chi Pham
Assistant Examiner—Ronald Abelson
(74) Attorney, Agent, or Firm—Fleshner & Kim, LLP

(57) ABSTRACT

In a method for controlling call access of a terminal in a mobile communication system based on cellular communication system, call access of mobile terminals can efficiently be controlled depending on the state of individual resources of Walsh code classes assigned to each mobile terminal from the base station and the state of a reverse link in a communication system which supports multi-transmission rate depending on service options of the mobile terminals. The method for controlling call access of a terminal in a mobile communication system includes the steps of permitting a base station to periodically broadcast call access control information including traffic information of a reverse link and information of at least one or more code classes in which Walsh codes assigned to a mobile station from the base station are classified depending on transmission rate, to a plurality of mobile terminals in its cell or sector, and permitting the mobile terminal to periodically receive the call access control information and requesting call access of the base station depending on the call access control information.

28 Claims, 4 Drawing Sheets

METHOD FOR CONTROLLING CALL ACCESS OF TERMINAL IN MOBILE COMMUNICATION SYSTEM

BACKGROUND OF THE INVENTION

Field of the Invention

The present invention relates to a method for controlling call access of a terminal in a mobile communication system based on cellular communication system, and more particularly, to a method for controlling call access of a terminal in a mobile communication system to improve efficiency of a given channel capacity under multimedia communication environments which transmit data at multi-transmission rate.

BACKGROUND OF THE RELATED ART

Related art call access procedures in a mobile communication system based on IS-95A cellular code division multiple access (CDMA) system will be described with reference to FIG. 1.

FIG. 1 is a flow chart illustrating the related art call access procedures.

Referring to FIG. 1, a base station broadcasts a pilot channel, a synchronous channel, and a paging or broadcasting channel to allow all of mobile terminals in its own cell or sector (a1, b1, c1). For transmitting data, the mobile terminal requests call access of the base station through an access channel (d1). The base station assigns a channel to allow call access according to request of the mobile terminal in a cell or sector of the base station, if call capacity in a reverse channel is within a set threshold value. While the base station does not assign a channel if the call capacity is greater than the threshold value (e1). Afterwards, the base station and the mobile terminal transmit and receive a preamble and real data therebetween (g1, h1).

In the related art mobile communication system based on IS-95A cellular CDMA system, a radio channel is varied depending on the call capacity. At this time, the mobile terminal may not identify information of variable Walsh codes. Accordingly, it is difficult for the base station to assign Walsh codes to a mobile terminal which requests call access after interference of a reverse link has been increased. If the mobile terminal tries new call access under the circumstances that communication quality becomes poor as above, it is likely to increase interference of the radio channel and also fail call access.

On the other hand, to solve such problems, in a next generation mobile communication system, each base station serves to control call access of the mobile terminal. In other words, the base station periodically notifies the state of a current radio channel capacity to all of mobile terminals in the same cell or sector. That is to say, the base station periodically monitors overall received power of the reverse link and periodically transmits monitoring results to all of mobile terminals in the same cell or sector. At this time, the base station transmits a busy/idle bit through a broadcasting channel BCCH, which is indicating whether a current channel capacity is a busy state or an idle state.

If interference of the current reverse link is smaller than the threshold value since traffic amount in the reverse link is small, the base station transmits the idle bit indicating that the current reverse link is in idle state to all the mobile terminals in the same cell or sector through the broadcasting channel, so as to allow the mobile terminals to try call access. By contrast, if interference of the reverse link is greater than the threshold value since traffic amount in the reverse link increases, the base station transmits the busy bit indicating that the current reverse link is in busy state to all the mobile terminals in the same cell or sector through the broadcasting channel so as to prohibit the mobile station from trying call access. All the mobile terminals in a service area of the base station receive the idle/busy bit from the base station and try call access depending on the state of the reverse link in the current base station.

If the mobile terminal additionally requests call access under the circumstances that interference of the reverse link is increased more than the threshold value, the base station ignores call access request from all the mobile terminals regardless of service options. This is to prevent quality of the overall communication channel from being deteriorated due to interference resulted from the base station allows new call access.

However, the aforementioned related art mobile communication system based on IS-95A cellular CDMA system has several problems in application for a communication system which supports multi-transmission rate depending on service options of the mobile terminal. The base station is required to assign Walsh code having different periods depending on types of transmission data, such as voice, image, text and the like, because the period of Walsh code assigned for the duration of one data symbol in a forward link is varied according as transmission rate is varied. As aforementioned, the period of Walsh code is varied depending on transmission rate and a group of Walsh codes having the same period is called as a code class.

Under the communication environment, if a plurality of mobile terminals in the same cell or sector request communication service with the same service options at the almost same time, a resource of Walsh code class corresponding to the service option of the mobile terminal becomes exhausted before interference of the reverse link exceeds the set threshold value.

Therefore, in case that the related art communication system is applied to a communication system which supports multimedia communication services, it is difficult to control individual call access to each code class, thereby failing to efficiently manage the resource of the radio channel. In that case, the mobile terminal may not identify its available code class and thus should receive the available code class through service negotiation. For this reason, overhead for service negotiation increases, thereby increasing interference due to unnecessary communication in the radio channel.

SUMMARY OF THE INVENTION

Accordingly, the present invention is directed to a method for controlling call access of a terminal in a mobile communication system based on cellular communication system, that substantially obviates one or more of the problems due to limitations and disadvantages of the related art.

An object of the present invention is to provide a method for controlling call access of a terminal in a mobile communication system based on cellular communication system, in which call access of mobile terminals can efficiently be controlled depending on the state of individual resources of Walsh code classes assigned to each mobile terminal from the base station and the state of a reverse link in a communication system which supports multi-transmission rate depending on service options of the mobile terminals.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method for controlling call access of a terminal in a mobile communication system includes the steps of permitting a base station to periodically broadcast call access control information including traffic information of a reverse link and information of at least one or more code classes in which Walsh codes assigned to a mobile station from the base station are classified depending on transmission rate, to a plurality of mobile terminals in its cell or sector, and permitting the mobile terminal to periodically receive the call access control information and requesting call access of the base station depending on the call access control information.

In another aspect, a data frame structure used for a method for controlling call access of a terminal includes a link busy/idle field indicating whether or not interference of a reverse link transmitted to a mobile terminal from a base station exceeds a preset threshold value, and a code class busy/idle field indicating whether or not a plurality of Walsh code classes are used.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 3:
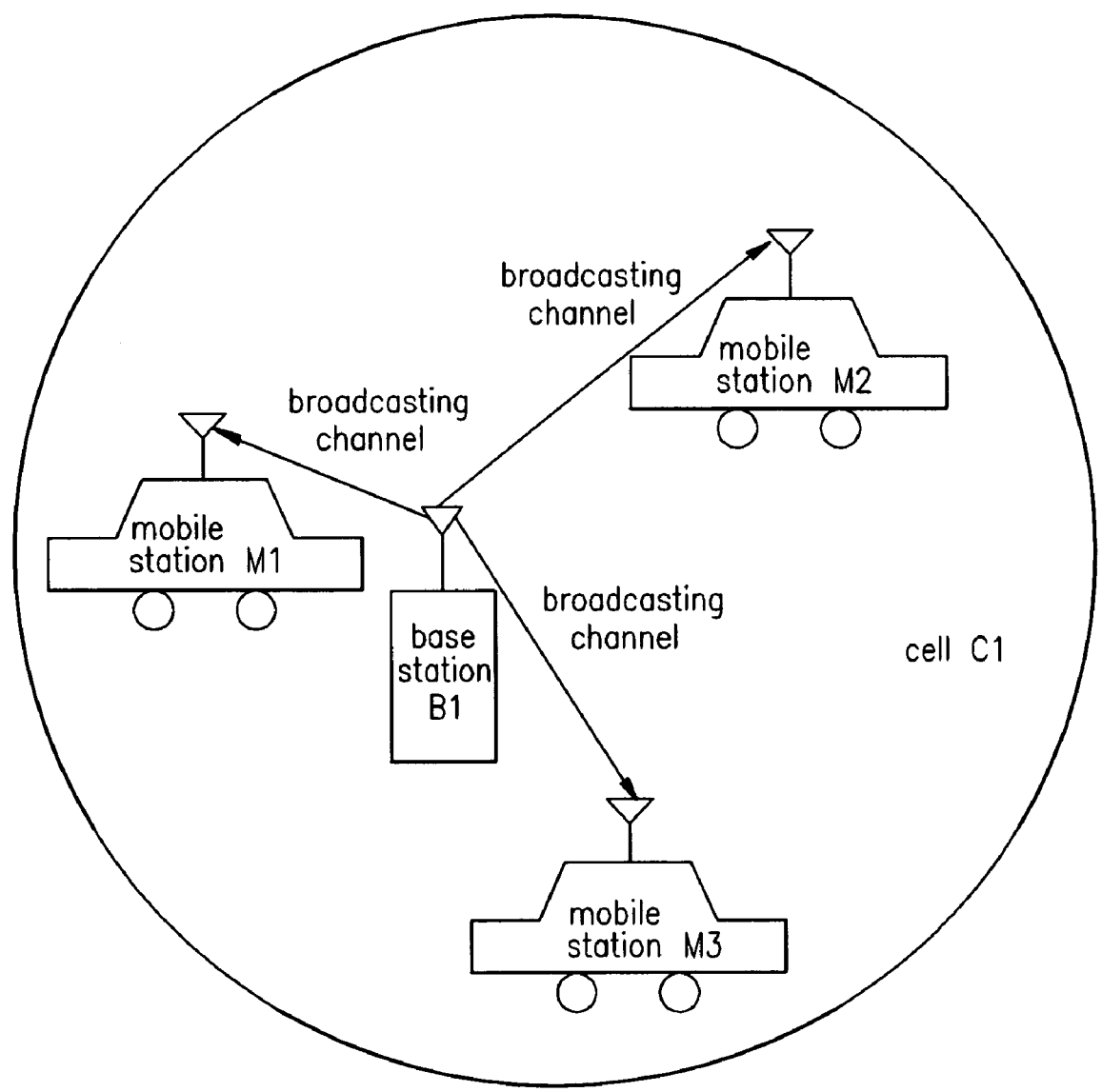
FIG. 3 shows call access operation in a mobile communication system based on cellular CDMA system according to one embodiment of the present invention.

In a communication system according to the present invention, a plurality of code classes consisting of a group of Walsh codes having different periods are classified and assigned to a base station in response to properties of current available transmission rate and data amount. Therefore, each base station transmits system information to all the mobile terminals depending on the state of an individual resource of Walsh code classes in a radio channel and traffic of a reverse link, as shown in FIG. 3. The system information includes a link busy/idle field 10 and a code class busy/idle field 20.

The link busy/idle field 10 indicates whether or not interference of the reverse link transmitted to the mobile terminal from the base station exceeds a preset threshold value. The code class busy/idle field 20 indicates whether or not a plurality of Walsh codes classes are available.

For example, if the interference exceeds the threshold value, a value of one bit assigned to the link busy/idle field 10 is set to "1" that is indicative of busy state, so as to cause all the mobile terminals not to request call access.

Figure 1:
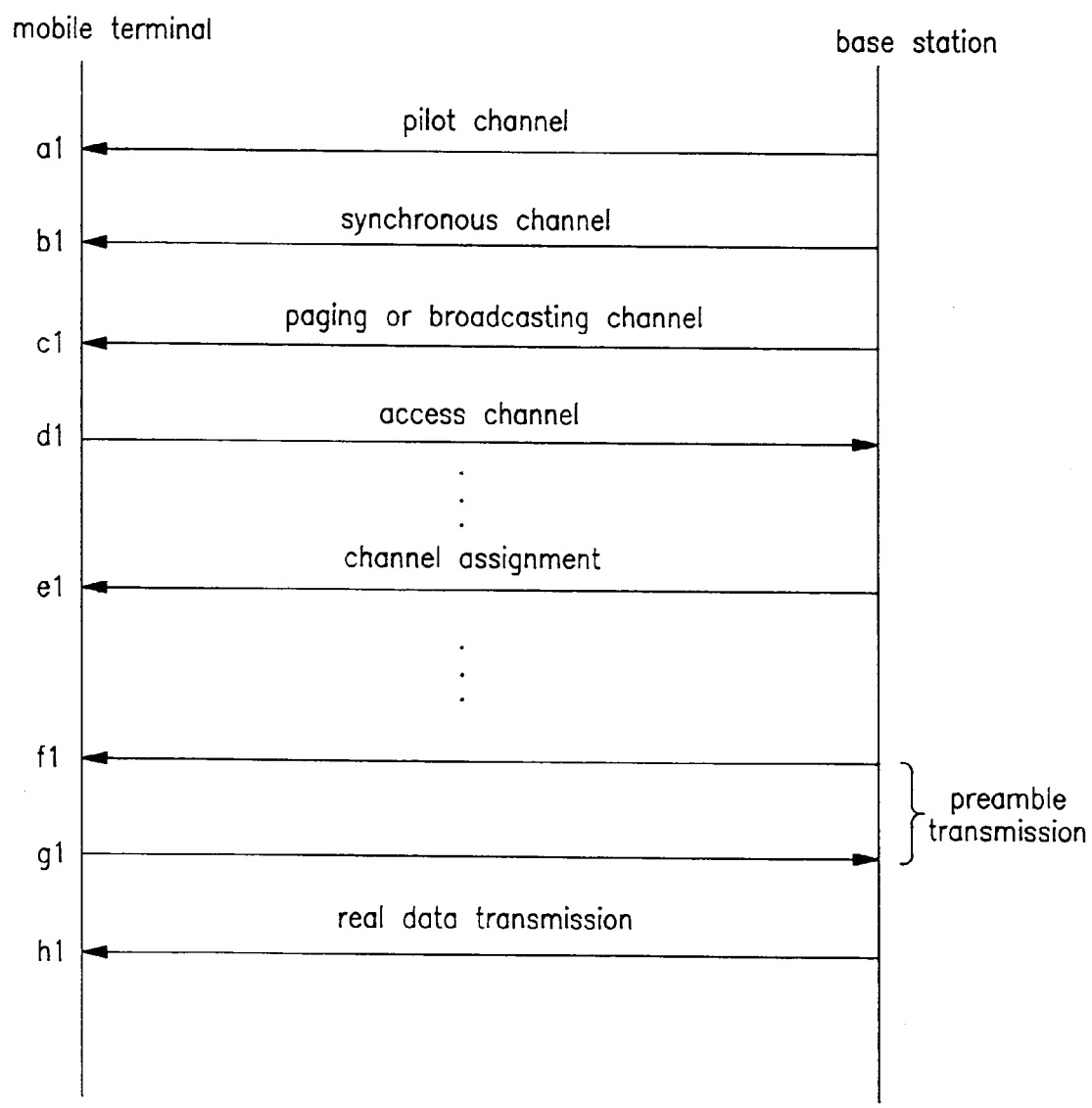
FIG. 1 is a flow chart illustrating call access procedures in a related art mobile communication system based on IS-95A cellular CDMA system.
Figure 2:
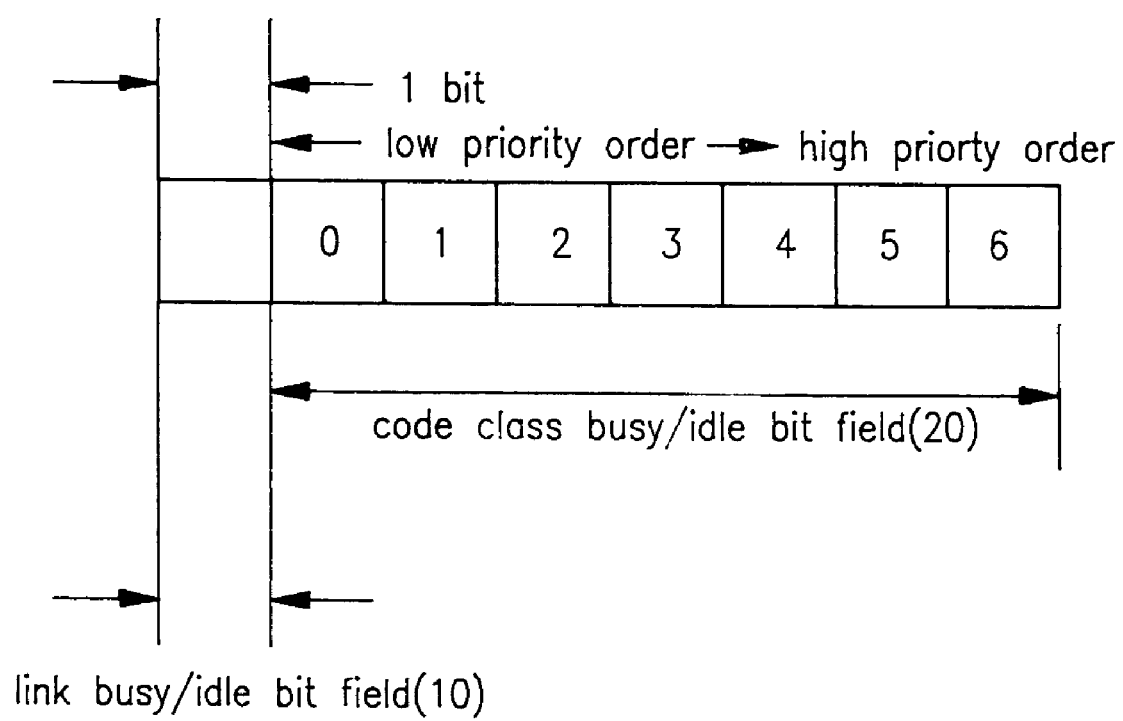
FIG. 2 shows a data frame used for assignment of a busy/idle bit in a broadcasting channel according to the present invention.

Also, a plurality of bits 0 to 6 assigned to the code class busy/idle field 20 are respectively set to "0" or "1" to indicate "idle state" or "busy state" depending on the state of Walsh codes which are available for each Walsh code class. At least one bit can be assigned to each code class depending on service options previously selected by a user terminal. In the present invention, a priority order is given in the order of code classes having short code length. For example, the highest priority is given to a code class having the shortest code length. In FIG. 2, high priority order is obtained as the code class goes up to 6 from 0. That is to say, the code length becomes longer as the code class goes up to 0 while the code length becomes shorter as the code class goes up to 6. In this regard, if there are provided two or more Walsh code classes, high Walsh code class having a relatively short code length has a relative higher priority order in comparison with low Walsh code class having a relatively long code length.

Therefore, in a communication system which supports multi-transmission rate to assign a plurality of code classes, if a plurality of mobile terminals request call access, a relative priority order is given to each code class assigned to mobile terminals. If the high code class is busy, call access may be requested by low code classes. However, the lowest code class of the low code classes is busy, the base station ignores call access request.

The link busy/idle field 10 and the code class busy/idle field 20, which are broadcasting through a forward link, are transmitted to each mobile terminal through a broadcasting channel BCCH. As an example of such a broadcasting channel, there is provided the broadcasting channel BCCH, as defined by International Telecommunication Union-Radio Sector (ITU-R), used for a mobile communication system based on CDMA system or a paging channel of IS-95. In case of the BCCH, the period of transmission for the busy/idle bit is determined per super frame unit. In case of the paging channel, the period of transmission for the busy/idle bit is determined per slot cycle unit. Since super frame or slot cycle is used, overhead occurring due to transmission of the link busy/idle field 10 and the code class busy/idle field 20, can almost be ignored.

A preferred embodiment according to the present invention will now be described with reference to FIGS. 3 and 4.

Figure 4:
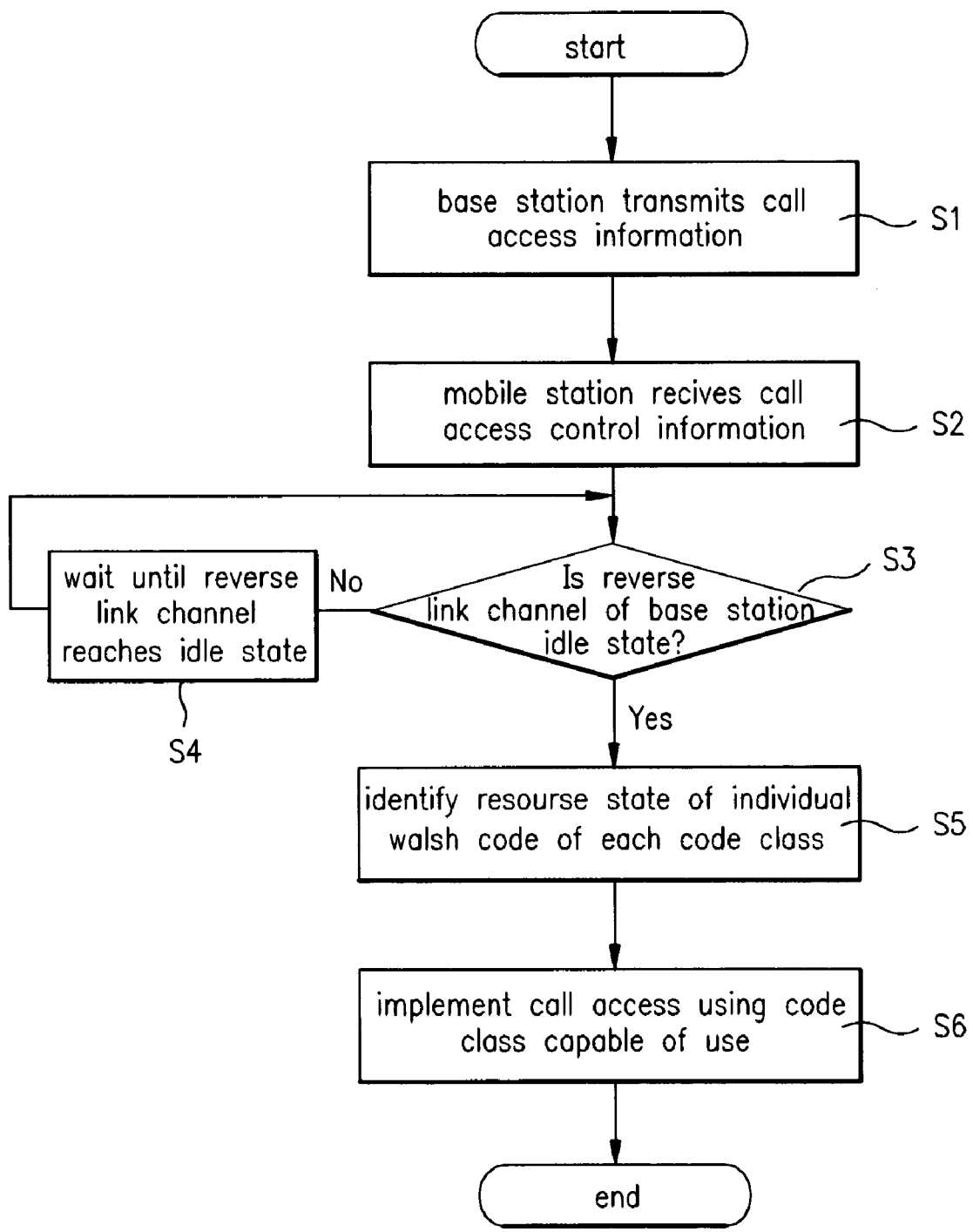
FIG. 4 is a flow chart illustrating call access control procedures in a mobile communication system based on cellular CDMA system according to one embodiment of the present invention.

Referring to FIGS. 3 and 4, a base station B1 transmits information having the data frame structure shown in FIG. 2 to all the mobile terminals in its cell at a predetermined time period. The base station B1 notify the link busy/idle field 10 whether or not interference of the reverse link transmitted to the mobile terminal from the base station exceeds a preset threshold value. The base station B1 also notify the link busy/idle field 10 whether or not each Walsh code class is used through respective bits 0 to 6 of the code class busy/idle field 20.

For example, it is assumed that Walsh code classes classified by 0 to 6 are assigned to the base station B1. It is also assumed that Walsh code classes from 0 to 2 in the base station B1 are all assigned to terminals of other users (i.e., the all Walsh code classes are busy) and Walsh code classes from 3 to 6 are idle. In this case, if interference of the reverse link does not exceed the threshold value, the base station B1 sets bit values corresponding to the code classes from 0 to 2 of the code class busy/idle field 20 of the broadcasting channel to "1", respectively, and sets other bit values to "0", respectively so that the bit values are transmitted to all the mobile terminals in a cell C1.

The mobile terminal receives call access control information transmitted from the base station (S2) and determines whether the state of the reverse channel is busy or idle (S3). If the current reverse channel is busy, the mobile terminal waits for until the reverse channel reaches idle state (S4). While, if the reverse channel is idle state, the mobile terminal identifies the state of an individual Walsh code resource of each code class (S5), so that call access is implemented by an available code class.

For example, it is assumed that service options of the mobile terminal M1 in the cell C1 or sector have been applied to support code classes from 3 to 6, service options of the mobile terminal M2 have been applied to support code classes from 2 to 5, and service options of the mobile terminal M3 have been applied to support code classes from 0 to 2. In this case, if the three mobile terminals M1–M3 request call access at the almost same time, the results are as follows.

First, the mobile terminal M1 tries call access to the highest code class 3. The highest code class 2 of the mobile terminal M2 is exhausted. Therefore, the mobile terminal M2 tries call access to the code class 3 having a next lower priority than the code class 2 by one level. Meanwhile, the mobile terminal M3 does not try call access because Walsh code resource of all the code classes 0 to 2 assigned to the mobile terminal M3 is exhausted, and continues to monitor the broadcasting channel so as to try call access when any Walsh code resource of the code classes 0 to 2 is idle.

As aforementioned, according to the present invention, in the communication system which transmits transmission data at multi-transmission rate depending on data properties and data amount, the base station transmits the state of an individual Walsh code classes assigned depending on data transmission rate and the state of the reverse link to all the mobile terminals in its cell or sector through the broadcasting channel or the call channel. Accordingly, each mobile terminal implements call access request depending on individual state of Walsh code classes and the state of the reverse link. If call access request is implemented, call access can optimally be controlled depending on priority order of code classes. Also, since the busy/idle bit is transmitted through the broadcasting channel or the paging channel for the unit of super frame or paging channel slot cycle, overhead due to transmission of the busy/idle bit is almost ignored.

As aforementioned, the method for controlling call access of a terminal in a mobile communication system based on cellular communication system has the following advantages.

Call access requested by each mobile terminal can efficiently be controlled so as to restrict unnecessary interference signal from being generated in the overall reverse link, thereby improving efficiency of the given radio communication channel. Also, communication quality of service provided from the overall communication system is improved as call access control is implemented.

It will be apparent to those skilled in the art that various modifications and variations can be made in the method for controlling call access of a terminal in a mobile communication system based on cellular communication system according to the present invention without departing from the spirit or scope of the invention. Thus, it is intended that the present invention covers the modifications and variations of the invention provided they come within the scope of the appended claims and their equivalents.

What is claimed is:

1. A method for controlling call access of a terminal in a communication system, comprising:
   broadcasting from a base station a call access control signal including interference information of a reverse link and state information of at least one or more code classes in which Walsh codes assigned to mobile stations from the base station are classified depending on transmission rate, to a plurality of mobile stations in its cell or sector on a paging channel or broadcast channel,
   wherein the call access control signal is broadcast independently from an uplink access channel request, and
   wherein a corresponding mobile station of the plurality of mobile stations uses the call access control signal to determine which code class to use when performing an uplink call access to uplink data from the corresponding mobile station to the base station.

2. The method as claimed in claim 1, wherein the information of each code class indicates whether the state of each code class is idle or busy.

3. The method as claimed in claim 1, wherein the call access control signal is transmitted through at least one of a broadcasting channel per super frame period and a paging channel per slot cycle period.

4. The method as claimed in claim 1, wherein the mobile station uses a code class having the highest priority if the mobile station requests call access of the base station.

5. A method of a call access control, comprising:
   transmitting a first status and a second status to a mobile terminal; and
   requesting an uplink call access using the received first and second status,
   wherein the first status is interference information and the second status is code class availability information, and
   wherein the first and second transmitted statuses are independently transmitted from the requested uplink call access.

6. The method of claim 5, wherein the first status is interference information of a reverse link.

7. The method of claim 5, wherein the second status indicates if a code class is idle or busy.

8. The method of claim 5, wherein the second status indicates if a plurality of code classes are idle or busy.

9. The method of claim 8, wherein the requested call access is based on a priority of the plurality of available code classes based on the second status.

10. The method as claimed in claim 5, wherein the first and second statuses are transmitted through at least one of a broadcasting channel per super frame period and a paging channel per slot cycle period.

11. The method as claimed in claim 5, wherein the mobile terminal uses a code class having the highest priority if the mobile terminal requests call access of the base station.

12. The method as claimed in claim 5, wherein the first status and second status is transmitted on a paging channel or broadcast channel.

13. A method for controlling call access in a communication system, comprising:
   repeatedly broadcasting from a base station uplink call access control information to a plurality of mobile stations, the call access control information including interference information and code class information, wherein the repeatedly broadcast call access control information transmitted independent of to a specific mobile station call access request, and wherein a corresponding mobile station uses the call access control information to determine which code class to use when performing an uplink call access to uplink data from the corresponding mobile terminal to the base station.

14. The method of claim 13, wherein the interference information is information of a reverse link and the code class information is information of at least one code class representing a set of Walsh codes assigned to the plurality of mobile stations and classified based on a transmission rate.

15. The method as claimed in claim 13, wherein the interference information of the reverse link compares overall received power from the plurality of mobile stations in the cell or sector of the base station with a predefined threshold value, and then selectively indicates whether a current reverse channel is idle or busy.

16. The method as claimed in claim 13, wherein the code class information indicates individually whether the state of each code class is idle or busy.

17. The method as claimed in claim 13, wherein the call access control information are transmitted through a broadcasting channel per super frame period.

18. The method as claimed in claim 13, wherein the call access control information are transmitted through a paging channel per slot cycle period.

19. The method as claimed in claim 13, wherein the mobile station uses a code class having the highest priority if the mobile station requests call access of the base station.

20. The method as claimed in claim 13, wherein, if the interference information of the reverse link in the call access control information is idle, the mobile station identifies the state of an individual resource of the code class so as to implement call access using a code class assigned to oneself among code classes which are idle.

21. A method for accessing a base station, comprising:
receiving call access control information including reverse link state information and Walsh code class state available information without requesting call access on a paging channel or a broadcast channel transmitted from the base station; and accessing the base station using an available code class based on the received Walsh code class state information and the reverse link state information.

22. The method as claimed in claim 21, wherein the code class information includes information on a plurality of code classes have relative priority orders if a code length of each code class is different.

23. The method of claim 21, wherein the reverse link state information is interference information.

24. The method of claim 21, wherein the reverse link state information indicates if a reverse link is idle or busy.

25. The method as claimed in claim 21, wherein the call access control information is transmitted through at least one of a broadcasting channel per super frame period and a paging channel per slot cycle period.

26. The method as claimed in claim 21, wherein a mobile terminal uses a code class having the highest priority if the mobile terminal requests call access of the base station.

27. A method for controlling call access in a communication system, comprising:
repeatedly broadcasting from a base station call access control information to a plurality of mobile stations on a paging channel or broadcast channel, the call access control information including interference information and code class state information; and performing an uplink call access using an available code class based on the call access control information, wherein the call access control information is repeatedly broadcast from the base station to the plurality of mobile stations independently from the uplink call access request.

28. The method as claimed in claim 27, wherein the mobile station uses a code class having the highest priority of available code classes based on the call access control information, if the mobile station requests call access of the base station.

* * * * *